United States Patent
Young et al.

(10) Patent No.: US 11,384,523 B2
(45) Date of Patent: Jul. 12, 2022

(54) COMBINATION OF A COVER PLATE AND A DRAIN AND USE OF SUCH COMBINATION

(71) Applicant: BLUCHER METAL A/S, Vildbjerg (DK)

(72) Inventors: Stuart Gordon Young, Cheshire (GB); Gary A. Hodge, Rutherfordton, NC (US)

(73) Assignee: BLUCHER METAL A/S, Vildbjerg (DK)

( * ) Notice: Subject to any disclaimer, the term of this patent is extended or adjusted under 35 U.S.C. 154(b) by 0 days.

(21) Appl. No.: 16/975,617

(22) PCT Filed: Feb. 26, 2019

(86) PCT No.: PCT/DK2019/050074
§ 371 (c)(1),
(2) Date: Aug. 25, 2020

(87) PCT Pub. No.: WO2019/161874
PCT Pub. Date: Aug. 29, 2019

(65) Prior Publication Data
US 2021/0010254 A1    Jan. 14, 2021

(30) Foreign Application Priority Data
Feb. 26, 2018  (DK) .............................. PA201870126

(51) Int. Cl.
*E03F 5/04*  (2006.01)
*G01C 9/24*  (2006.01)
(Continued)

(52) U.S. Cl.
CPC ............ *E03F 5/041* (2013.01); *E03F 5/0407* (2013.01); *E03F 5/0411* (2013.01);
(Continued)

(58) Field of Classification Search
CPC . E03F 5/04; E03F 5/0407; E03F 5/041; E03F 5/0411; E03F 7/02;
(Continued)

(56) References Cited

U.S. PATENT DOCUMENTS 1,812,583 A * 6/1931 Cavalieri ............ E04D 13/0409
                                                      210/163
3,445,973 A * 5/1969 Stone .................... E03F 5/0407
                                                      210/163
(Continued)

FOREIGN PATENT DOCUMENTS

DE       9413695 U1    10/1994
DE       9413695   * 12/1994
(Continued)

OTHER PUBLICATIONS

Search Report for corresponding Danish patent application No. PA 2018 70126, dated Aug. 1, 2018, 3 pages.
(Continued)

*Primary Examiner* — Christopher Upton
(74) *Attorney, Agent, or Firm* — Day Pitney LLP; George N. Chaclas

(57) ABSTRACT

A combination of a cover plate and a drain, preferably a floor drain is described. The cover plate is provided with first locking means and the drain is provided with cooperating second locking means for releasable connection of the cover plate to the floor drain. The cover plate is a temporary cover plate for use during installation of the drain. The cover plate may be used for a temporary protection of a drain during installation of the drain and for installing and adjusting the inclination of the drain without the need of separate levelling tools. To obtain this the cover plate is provided with levelling means for determining the orientation of the cover plate and thereby also the drain in relation to a horizontal or a vertical plane. The first locking means or the second locking (Continued)

means comprises a weakening arranged such that at least a part of the locking means is preferably damaged when the cover plate is removed from the drain to ensure that the cover is not reused.

18 Claims, 11 Drawing Sheets

(51) Int. Cl.
*G01C 9/34* (2006.01)
*E04D 13/04* (2006.01)
*G01C 9/36* (2006.01)
*E03F 5/06* (2006.01)

(52) U.S. Cl.
CPC ........... *E04D 13/0409* (2013.01); *G01C 9/24* (2013.01); *G01C 9/34* (2013.01); *G01C 9/36* (2013.01); *E03F 2005/0414* (2013.01); *E03F 2005/063* (2013.01)

(58) Field of Classification Search
CPC ........ E03F 2005/0414; E03F 2005/063; E04D 13/0409; E04D 2013/0436; G01C 9/00; G01C 9/18; G01C 9/24; G01C 9/26; G01C 9/34; G01C 9/36
USPC ....................... 210/163, 164; 52/302.1, 302.7
See application file for complete search history.

(56) References Cited

U.S. PATENT DOCUMENTS

| | | | |
|---|---|---|---|
| 5,244,040 A * | 9/1993 | Pecue, II | G01C 9/36 166/250.01 |
| 5,265,752 A | 11/1993 | Olson et al. | |
| 5,921,282 A | 7/1999 | Castillo et al. | |
| 6,076,559 A | 6/2000 | Castillo et al. | |
| 6,568,021 B1 * | 5/2003 | Wood | E04F 21/161 15/235.4 |
| 6,668,417 B1 * | 12/2003 | Slattery | G01C 9/26 15/235.4 |
| 7,735,512 B1 | 6/2010 | Ismert et al. | |
| 9,651,372 B1 * | 5/2017 | Lopez | G01C 9/24 |
| 9,869,081 B1 * | 1/2018 | Pardo, Jr. | E03D 11/16 |
| 2005/0138722 A1 * | 6/2005 | Humber | E03D 11/16 4/252.1 |
| 2007/0034577 A1 * | 2/2007 | Bayard | E03F 5/06 210/163 |
| 2007/0246116 A1 * | 10/2007 | Peak | G01C 9/18 138/104 |
| 2011/0126935 A1 | 6/2011 | Zeyfang | |
| 2012/0234430 A1 | 9/2012 | Zeyfang | |
| 2012/0240319 A1 * | 9/2012 | Yssel | E03D 11/16 4/252.1 |
| 2017/0159278 A1 | 6/2017 | Huber | |
| 2018/0073237 A1 * | 3/2018 | Say | E03F 5/0411 |
| 2019/0316341 A1 * | 10/2019 | Say | E03F 5/0411 |

FOREIGN PATENT DOCUMENTS

| | | | |
|---|---|---|---|
| EP | 1464768 A2 | 10/2004 | |
| EP | 1956153 | * | 8/2008 |
| EP | 1956153 A1 | 8/2008 | |
| EP | 3031990 A1 | 6/2016 | |
| KR | 20040104211 A | 12/2004 | |

OTHER PUBLICATIONS

International Search Report from corresponding international patent application No. PCT/DK2019/050047, dated Apr. 24, 2019, 7 pages.
Supplementary European Search Report issued in corresponding European patent application No. 19757003, dated Oct. 21, 2021, 2 pages.

* cited by examiner

COMBINATION OF A COVER PLATE AND A DRAIN AND USE OF SUCH COMBINATION

RELATED APPLICATIONS

This application is a U.S. national stage of Patent Cooperation Treaty Patent Application No. PCT/DK2019/050074 filed Feb. 26, 2019, which claims the benefit of Danish Patent Application No. PA201870126 filed on Feb. 26, 2018, the entire contents of each are hereby incorporated herein by reference.

FIELD OF THE DISCLOSURE

The present disclosure relates to a combination of a cover plate and a drain, preferably a floor or roof drain, wherein the cover plate is provided with first locking means, and wherein the drain is provided with cooperating second locking means for releasable connection of the cover plate to the drain.

Moreover the subject technology relates to the use of such combination.

BACKGROUND OF THE DISCLOSURE

When mounting a drain in a floor or another plane surface, it is proper to adjust the inclination of the drain in order for a correct drainage of the surface in which the drain is arranged. Moreover, it is also proper to protect the drain against damages which can occur on the drain during the installation and also to protect the drain against debris which may fall into an open drain, and prevent possible injury through trips and falls.

In prior art, an inclination of a drain has been adjusted by means of separate level tool. This is an instrument which is commonly known to indicate whether a surface is horizontal (level) or vertical (plumb). Level tools occur in different embodiments used by carpenters, bricklayers and other building trades' workers including workers installing drain systems in a surface to be drained which may be arranged inside or outside a building.

When using a separate level tool, there is a risk that the level tool has an extension which is insufficient or not suitable for a specific drain to be installed. Moreover, there is a risk that the drain may be affected after installation and aligning and this would cause the drain to be misaligned when the surrounding floor or covering at a later time is provided.

When providing the surrounding floor or surrounding surface covering, there might be a risk that debris fall into the drain as it has an uncovered upwardly opening. Moreover the upper side of the drain may be damaged when providing the surrounding floor or surrounding surface covering.

European patent application No. EP 1464768 discloses a combination of a drain with a cover plate in form of a grate. The cover plate and drain is provided with cooperating locking means for releasable connection of the grate to the drain. The grate will not protect the drain against debris which may fall into the drain during installation of the drain. Moreover the grate cannot be used for ensuring correct levelling of the drain during installation.

SUMMARY

In order to protect the drain, it is suggested to provide a cover plate which is arranged over the open drain. In other solutions also a plastic film covering a grating in a drain bowl is used.

An object of the present disclosure is to provide a combination of a cover plate and a drain in which the cover plate can be used to ensure a correct levelling and aligning of the drain during installation and which simultaneously protects the drain during installation and before the drain is taken into use.

It is desired that the cover plate is arranged in such a way that the level is maintained in its position during and after installation in order to ensure the correct position and inclination of the drain after the installation procedures is finished and the surrounding floor or surrounding surface covering is provided.

The cover plate may be provided with level means for determining the orientation of the cover plate and thereby also the drain in relation to a horizontal plane or a vertical.

According to an aspect the combination is used for a temporary protection of a drain during installation of the drain.

According to another aspect the combination is used for installing and adjusting the inclination of the drain without need of separate level tools.

With the combination of a cover plate and a drain comprising an interacting first and second locking means it is possible to attach the cover plate to a drain in a secure way. Hereby the correct position of the cover plate in relation to the drain is assured.

With the correct mutual positioning of the cover plate and the drain a level arranged integral with the cover plate will continuously indicate the inclination of the drain as long as the cover plate is connected to the drain.

When the cover plate is arranged on the drain it is ensured that there is a secure contact which closes the upwardly open part of the drain. The open part of the drain will be tightly closed by the cover plate when the first and second locking means are in engagement with each other.

The drain and the cover plate can have any form. Preferably they will have a rotational symmetry, such as a cylindrical shape. However, they may also have other shapes such as oval or polygonal, such a triangular, rectangular, pentagonal, hexagonal or octagonal.

After installation of the drain is completed, the drain shall be opened. This is established by disengaging the locking means.

The locking means are preferably arranged such that at least a part of the locking means is damaged when the cover plate is removed.

When the locking means is damaged, it is ensured that the cover plate will not be attached to the drain afterwards. This is important as the cover plate may be arranged in incorrect position and thereby can give an incorrect indication of the inclination of the drain. This may also incur risk that debris can fall into the drain with an incorrect positioned cover plate.

According to a further aspect the combination, the first locking means or the second locking means comprises a weakening arranged such that at least a part of the locking means is damaged when the cover plate is removed from the drain as the cover plate is a temporary cover plate for use during installation of the drain.

The opening of the drain after installation is easy to conduct due to the weakening arranged in the first or second locking means.

The weakening will provide a damage of the locking means. The result is that the cover plate cannot be reused and mounted on another drain. This will ensure that a damaged cover plate cannot be arranged on a drain in an incorrect position.

The level means used can be of different types. It is important that they have a sensitivity which is adapted to the extension of the cover plate. The sensitivity of a level is given as a change of angle or gradient which is required to move a bubble in a given distance inside a tube.

The level can be arranged with a slightly curved glass tube with constant inner diameter or be arranged with an un-curved barrel-shaped tube with a slightly larger diameter in its middle.

It is also possible that the level is a bull's eye spirit level.

According to a further aspect, the level means is chosen between a bull's eye spirit level and a combination of two perpendicularly arranged tubular spirit levels.

As mentioned different types of levels may be used. However, when using the straight tubular spirit level it is important that there are used two tubular spirit levels which are arranged perpendicular to each other. Hereby it is possible to have an adjustment of the inclination of the drain in any directions and not only in one direction indicated with only one tubular spirit level.

The use of a bull's eye spirit level will also ensure the possibility of adjusting the inclination in any direction in a 360° orientation.

According to a further aspect the combination, the level means comprises a bubble housing being provided with graduations for visual indication of an inclination.

The sensitivity is important. The sensitivity of a level is given as the change of angle required to move a bubble by a unit distance. If the bubble housing is provided with graduations indicating the unit distances then it is possible to have a visual indication of a desired tilt needed for a given drain. Such tilt can be orientated in any direction. Hereby the cover plate makes it possible to adjust the tilt of a drain in a floor or a surface outside a building.

According to a further aspect the combination, the cover plate is made of plastic, preferably polypropylene, and that the level means is embedded into the cover plate, preferably in a plane surface thereof.

When the cover plate is made of plastic, it is possible to mold the plastic with the level means embedded into the cover plate. Normally the cover plate will be a flat plate having a plane surface. Therefore in such situation the level means are embedded into the plane surface.

The level means may also be mounted in the surface of the cover plate with an extension above the surface of the cover plate. However, for protecting the level, it is preferred that the level is embedded into the surface of the cover plate.

The level may be arranged in any part of the cover plate. However, it is preferred that the level is provided in a central part of the cover plate.

The level is made as an integral part of the cover plate. It is preferred that the level is provided in the cover plate during the manufacture thereof, however it may be mounted in the cover plate after the cover plate has been manufactured. In both situations it is important that the level is secured into the cover plate in order to be an integral part thereof. This can be established either by shrinking, gluing or with other fixation means.

According to a further aspect, the weakening is a weakening line, which is arranged to ensure that at least a part of the first locking means breaks off when the cover plate is removed.

When removing the cover plate, at least a part of the locking means may break of. This is ensured when a weakening line is arranged in the locking means or is arranged between the locking means and the cover plate.

According to a further aspect, the first locking means comprises locking tabs arranged along a circumferential edge of the cover plate and that the second locking means comprises a flange or a groove in the drain.

Most drains will be arranged with a flange in the upper part along an upwardly opening. Therefore it is preferred that the first locking means comprises locking tabs arranged along a circumferential edge of the cover plate. The circumferential edge of the cover plate will be adapted to the actual form of the upper part of the drain. When the drain is provided with a flange the locking means can be tabs which are arranged with an arrow-shaped or toothed front part which can be engaged beneath the flange.

The tabs may be flexible in such a way that they can be pressed down and the arrow-shaped front part of the tabs can enter into engagement with the flange. When the cover plate shall be removed then the weakening line causes a damaging and the tabs will break off when the plate is removed.

Instead of having an engagement beneath a flange, it is also possible to have an engagement in a groove or holes provided in the drain and in which the locking tabs may enter into engagement.

According to a further aspect the combination, the cover plate comprises at least one opening in which a tool can be inserted in order to tilt or rotate the cover plate. Said opening is provided in a top surface of the cover plate.

According to a further aspect the combination, the tilting or rotation of the cover plate causes a damaging of locking means by a tilting or rotational movement of the cover plate for removing the cover plate from the drain.

When the cover plate is arranged on the drain arranged in the surrounding floor or ground, a covering is established. The cover plate can be removed in order to place a grating in the drain or in order to connect the drain with pipework in the space above the surface in which the drain is positioned. As the cover plate comprises an opening in a top surface, a tool can be inserted into the opening order to tilt or rotate the cover plate to remove it from the drain.

If a rotation is established, the locking means can be provided in the form by bayonet-coupling having toothings or projections which allow a rotation only in one direction and which causes a breaking off of the tabs provided with toothings or projections when rotation is effected in the other direction. If the tabs are used to engage in a groove in a flange or beneath a flange then a tilting will cause the damaging of the locking tabs.

According to a further aspect the combination, the opening in the cover plate is a slit in which a screw driver may be inserted.

Seeing that most workers always will have a screw driver in their tool box, it is convenient that the opening is one or more slits in which one or more screw drivers are inserted. The bending force exerted with the screw driver will easily cause a tilting of the cover plate which causes the damaging of the locking means.

Alternatively, it is possible to provide a ring pull in the cover plate. Hereby the cover plate can be removed like opening a can of sardines. In this situation the locking means can be provided in form of a weakening line dividing the cover plate in a central portion and a circumferential portion which breaks off and is removed when pulling the ring pull. In this embodiment the workers do not need a tool for removing the cover plate.

According to a further aspect the combination, the drain is a drain bowl, a drain stub or other drain unit arranged for mounting in a floor or other horizontal surface from which liquid shall be drained.

The drain can have any form or be of any type. It may be a bowl or a stub or another drain unit which is arranged in a floor or any other surface from which liquid shall be drained. The advantages of the level means being integral with the cover plate will be usable in all types of drain.

Even though a drain would normally be arranged in a horizontal surface, it is also possible to have vertical surfaces in which drains are arranged. Accordingly, the cover plate will also be usable for covering drains arranged in vertical or oblique surfaces.

It is known that drains are arranged with an angle and provided in a floor and/or a wall. A cover plate can also be used in such drain.

It is explained that the cover plate will have a hole for breaking away by means of a screwdriver. However, it is also possible to provide holes which usable with other special tools. Accordingly, the hole can be arranged in such a way that it can be used together with an allen key for rotating the cover plate in order to break the tabs.

The cover plate has especially been explained in connection with security during construction of a house. However, a cover plate can also be used for security application, e.g. in prisons or psychiatric hospitals. Hereby it is impossible for people to hide items in the drain without the possibility that this would be observed by guards.

According to a further aspect the combination, the cover plate is made by vacuum forming and comprising a circular part and a circumferential wall connected to the circular part and having a narrow portion at a distal end of the circumferential wall.

The vacuum formed cover plate is simple to produce. The tool manufacturing time is limited and accordingly, it is possible to produce different tools within a few days at low costs.

In the vacuum formed cover plate, the circumferential wall will have a narrow portion which constitutes the first locking means. The narrow portion at the distal end of the circumferential wall is intended to engagement under the flange hereby securing the cover plate to the drain.

When mounting the cover plate to the drain, a clamping membrane can be arranged between the circular part of the cover plate and the flange.

According to a further aspect the combination, at least one perforation is provided in the circumferential wall.

The perforation which is provided in the circumferential wall will ensure that the wall is damaged whereby it is possible to remove the cover plate from the drain.

It is preferred that the cover plate is provided with incisions at the transition between the circular part and the circumferential wall. The incisions may be used for insertion of tools to break away the circumferential wall. Furthermore, the incisions will make it easier to remove the cover plate from the flange of the drain as the narrow portion can be bent outwardly when lifting the cover plate away from the drain.

According to a further aspect the combination, the first locking means is at least one slit which is provided in a recessed part of the surface of the cover plate, which recessed part via wall parts is connected to the surface of the cover plate, that the wall parts are provided with a wall opening connected with the slit, that the cooperating second locking means comprises a screw passing through a corresponding slit for connecting the cover plate to the drain, that the screw is screwed into a thread provided in the drain and that the slit and wall opening is arranged such that after loosening the screw a rotation of the cover plate brings the screw through the wall opening for releasing the connection of the cover plate to the drain.

With this embodiment, there is no part of the locking means which are damaged when the cover plate is removed. When the cover plate is to be arranged on the drain the screws used for attaching the grate to the drain is loosened and hereby it is possible to place the cover plate on top of the drain and align the screws with the corresponding slits. Then the rotation of the cover plate will bring the screws into the slit. At the end portion of the slit there is preferably provided a chamfer to allow a flat head screw to sit in. This will ensure a correct positioning of the cover plate on the drain.

After tightening the screws, the cover plate will be placed correctly on top of the drain.

After use, the cover plate should be removed. This is done by loosening the screws. When the screws are loosened the cover plate may be turned in the way opposite the direction used for placing the cover plate on the drain. Hereby the screw will move through the slit and could go out through the wall opening.

The slit will preferably open out into the wall opening whereby there is an open connection which allows the screw head to pass through the wall opening. Hereby it is possible to lift the cover plate free of the drain.

The cover plate may voluntarily be provided with a protective sheet having a form corresponding to the surface of the cover plate. The protective sheet will ensure that matters cannot enter into the recessed parts of the top surface of the cover plate.

Moreover, the protective sheet may also be used to indicate whether a tampering has been effected after the cover plate has been arranged on the drain. The protective sheet may be glued to the surface of the cover plate after the cover plate is arranged on a drain. Hereby it is only possible to have access to the screws by removing the protective sheet. Hereby the removal will be an indication that the cover plate has been removed earlier and thereby there is a risk for a misaligning of the cover plate. Even though there is no damaging of the locking means when removing the cover plate, then a damaging of the protective sheet will give a security as an unbroken protective sheet is an indication that the cover plate is arranged correct on the drain.

The combination according to the subject technology may be used for a temporary protection of a drain during installation of the drain. The combination according to the instant disclosure may also be used for installing and adjusting the inclination of the drain without need of separate level tools.

DESCRIPTION OF THE DRAWINGS

Embodiments of the subject technology will be described by way of example only and with reference to the accompanying drawings.

DETAILED DESCRIPTION OF THE PREFERRED EMBODIMENTS

In the following text, the figures will be described one by one and the different parts and positions seen in the figures will be numbered with the same numbers in the different figures. Not all parts and positions indicated in a specific figure will be discussed in connection with that figure.

Figure 1:
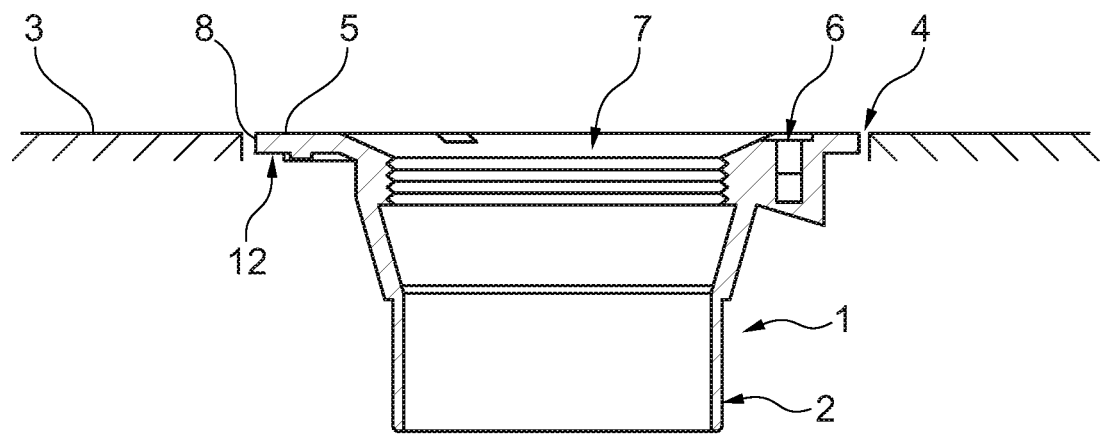
FIG. 1 shows a section through an embodiment of a drain.

FIG. 1 illustrates a drain 1 comprising a lower part 2, which is intended for connection with piping below the surface 3 in which the drain 2 is arranged. The drain comprises an upper end 4 having a flange 5 which is preferably a circumferential flange. The drain comprises a hole 6 which is intended for use with a screw used to fasten a grating (not illustrated) which is used to cover an upwardly opening 7 of the drain 1.

The flange 5 has a thickness 8 which is adjusted to the specific cover plate as explained later.

It is noted that there will always be an additional layer on top of a first pour which is made by the main contractor. The finish of a floor will be effected by a floor contractor.

Therefore a space will exists between the drain and the floor made by the first contractor and the space makes it possible to provide tabs for a cover plate as explained later. The space will be covered by the floor contractor.

When the floor contractor has finished the work, the tabs of the cover plate covering the drain will be embedded in the finishing layer of the floor.

The drain can be produced from different materials. The drain can be made from plastic, metal cast iron, concrete, clay or other materials which are found suitable for manufacture of a drain.

Figure 2:
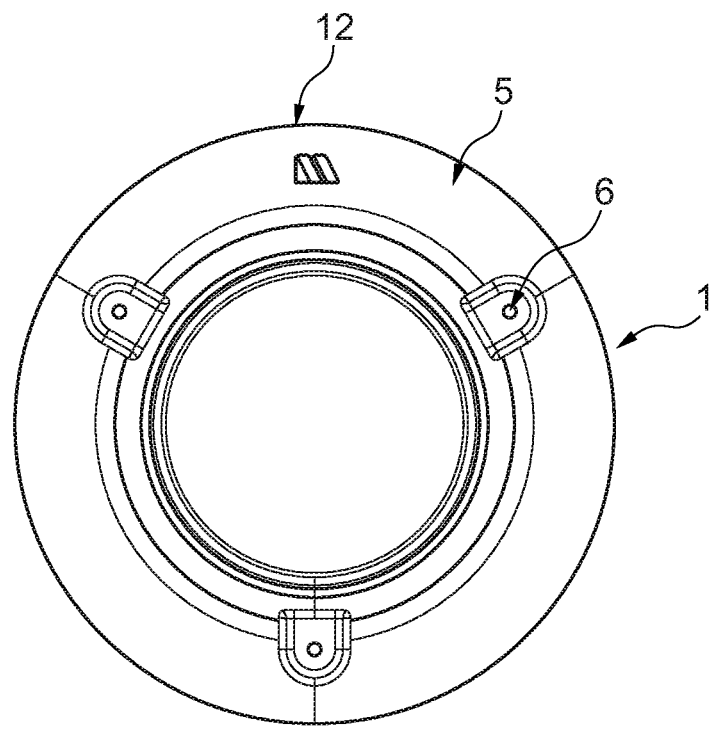
FIG. 2 shows the drain of FIG. 1 as seen from above.

In FIG. 2, it is seen that the flange 5 is a circular flange. However, the flange might have other configurations and the flange does not necessarily need to be a circumferential flange 5.

Figure 3:
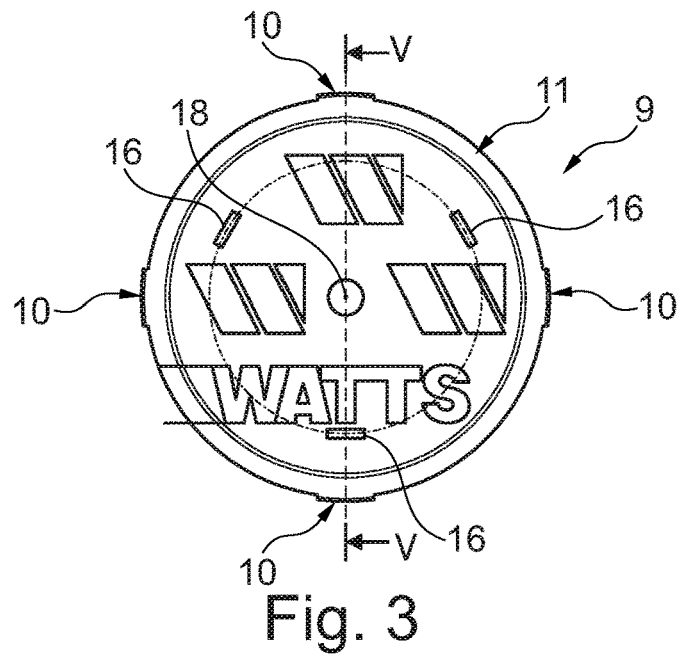
FIG. 3 shows an embodiment of a drain seen from above, and intended for use in combination with the drain of FIG. 1.

FIG. 3 illustrates a cover plate 9 which is used for covering the opening 7 of the drain 1. The cover plate 9 is provided with first locking means which are provided in form of locking tabs 10 which are arranged along a circumferential edge 11 of the cover plate 9. The locking tabs 10 cooperate with second locking means in form of the edge area 12 of the flange 5. As more clearly illustrated in FIGS. 4-6 one can see that the locking tabs 10 comprise a leg portion 25 connecting a wedge shaped outer end 13 with the plate portion 14 of the cover plate 9. The leg portion 25 is flexible and thereby provides the possibility that the locking tabs 10 may be pressed down over the flange 5 whereby the outer end 13 will enter into engagement with the edge area 12 at the downwardly orientated surface of the flange 5. Hereby the cover plate will be connected to the drain.

Figure 6:
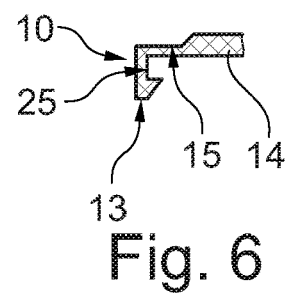
FIG. 6 illustrates an enlarged detail of the cross section of FIG. 5.

As most clearly illustrated in FIG. 6, the cover plate comprises a weakening line 15 connecting the locking tab 10 with the plate portion 14. Accordingly, the connection between the cover plate and drain is releasable. The locking tabs 10 will break off when the cover plate is removed from the drain as the lower end 13 will have engagement with the downwardly orientated surface of the flange 5 and therefore a breaking will occur along the weakening line 15.

Figure 9:
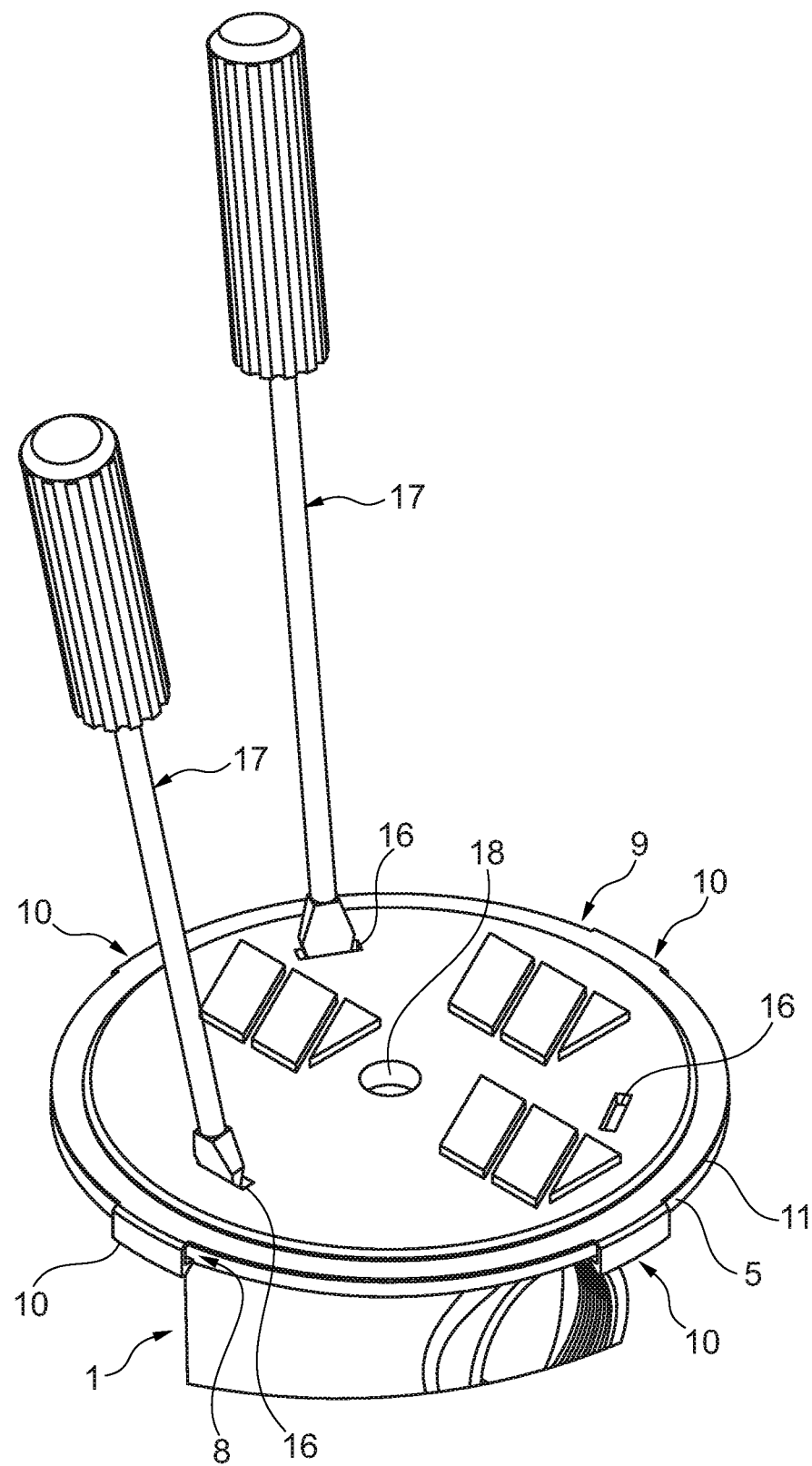
FIG. 9 illustrates an initial step in removing the cover plate of FIGS. 3-8 from a drain according to FIGS. 1 and 2.

The cover plate 9 is provided with openings 16. Each opening 16 may be slit-formed and intended for the engagement with a screw driver 17 as illustrated in FIG. 9. The screw driver is used for removing the cover plate 9 from the drain 1.

The cover plate comprises a hollow 18. The hollow 18 is intended to contain a level means 19 (see description below) which is intended for determining the orientation of the cover plate and thereby also the orientation of the drain 1 in relation to a horizontal plane or a vertical. The level means 19 may be fixed in the hollow 18 in different ways. The fixation is intended to be fixed and not removable in order to secure that the level means always will have a fixed orientation in relation to the cover plate 9.

The level means may be cast into the cover plate during production of the cover plate or may be attached in the hollow by gluing after the production of the cover plate with the hollow 18.

Figure 7:
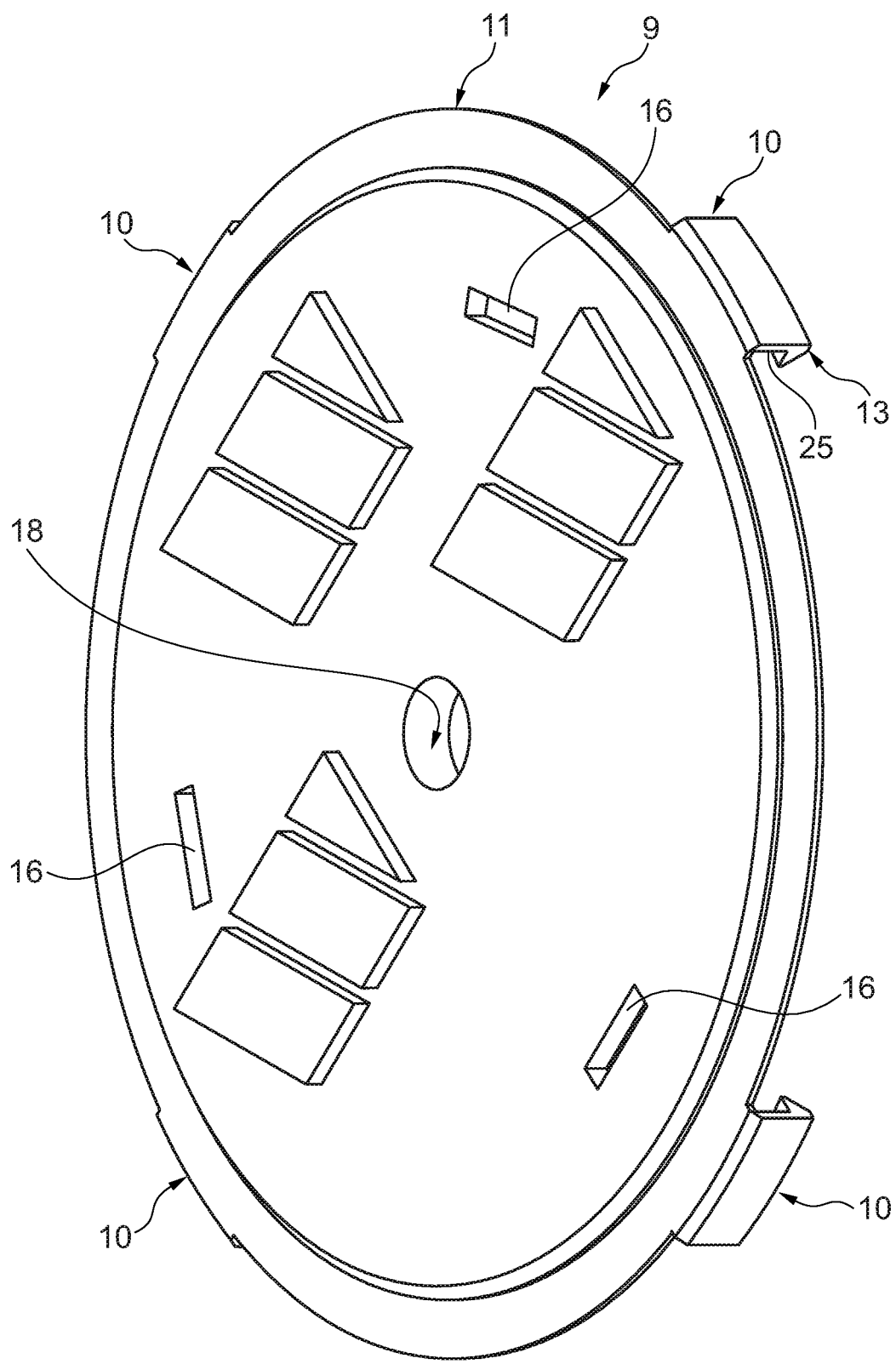
FIG. 7 illustrates a perspective view of the cover plate illustrated in FIGS. 3-6 as seen from above.
Figure 8:
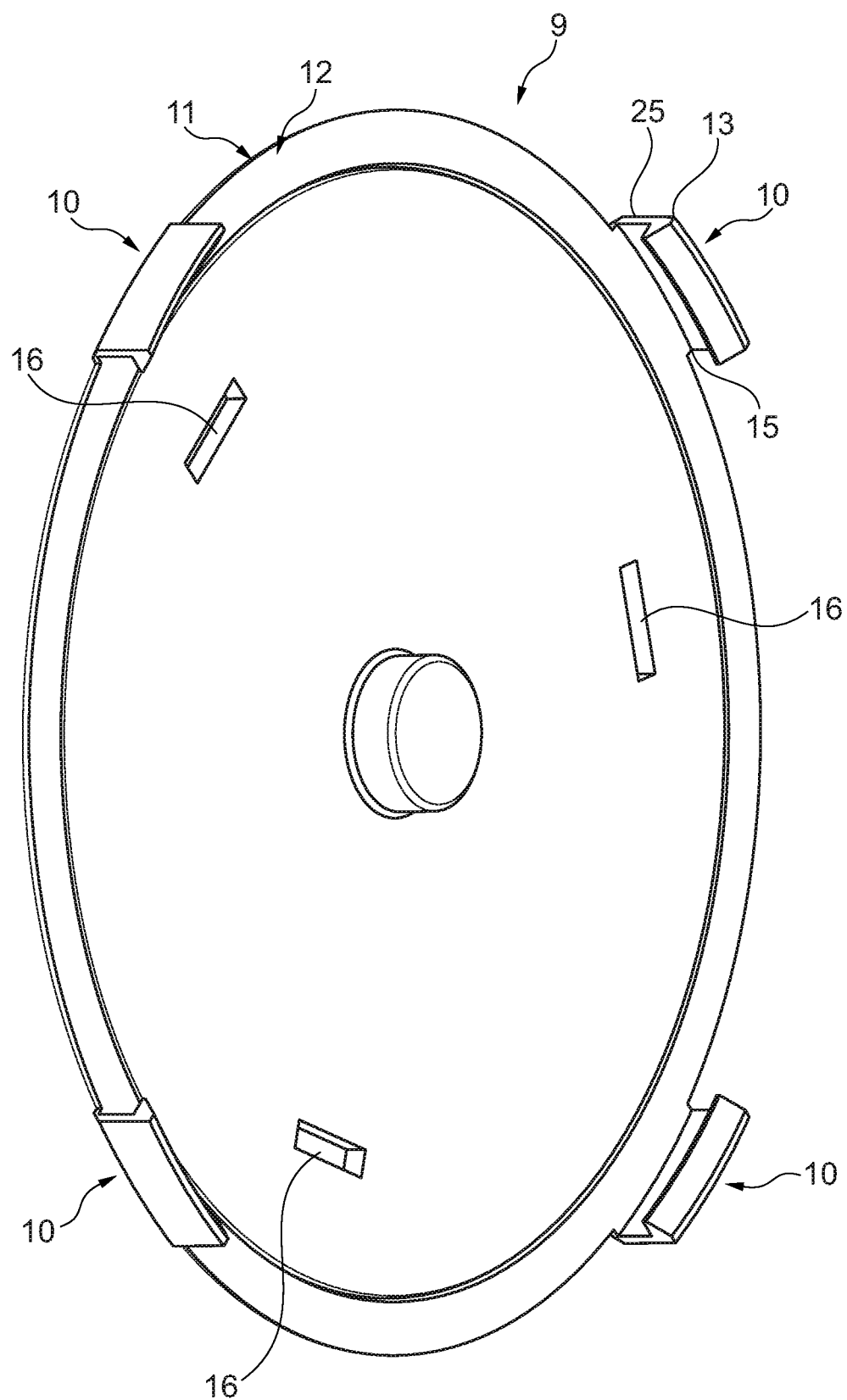
FIG. 8 illustrates a perspective view of the cover plate illustrated in FIG. 7 as seen from below.

FIGS. 7 and 8 illustrate an enlarged perspective view of the cover plate as seen from above and from below. Reference numbers are inserted in order to more clearly indicate the elements already explained in connection with FIGS. 3-6.

FIG. 9 illustrates a situation in which screw drivers 17 are inserted into the openings 16. When a bending force is exerted with the screw driver there will easily be a tilting of the cover plate which causes the breaking of the locking tabs 10 along the weakening line 15.

Figure 10:
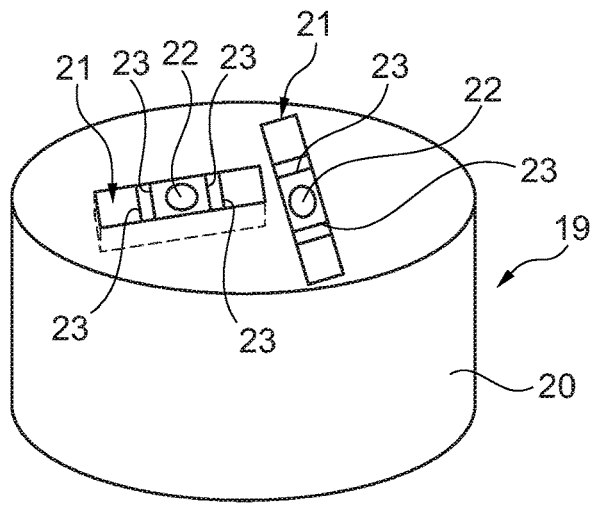
FIG. 10 shows an embodiment for level means to be used in the cover plate.
Figure 11:
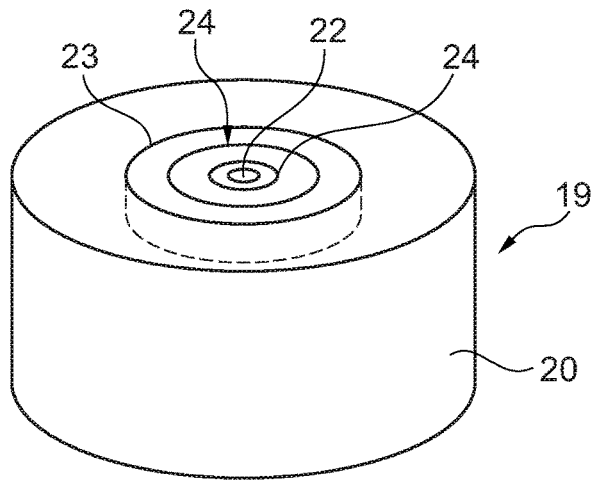
FIG. 11 shows a further embodiment for level means to be used in the cover plate.

FIGS. 10-11 illustrate embodiments for level means 19. The level means 19 comprises a housing 20 which is intended for being fixed in the hollow 18 in the cover plate 9.

In FIG. 10, the level means 19 comprises two perpendicularly arranged tubular spirit levels 21. Each of the levels comprises a bubble 22 and graduation 23 for visual indication of inclination.

FIG. 11 illustrates a bull's eye spirit level 24. This bull's eye spirit level also comprises a bubble 22 and graduations 23 for visual indication of an inclination.

Figure 12:
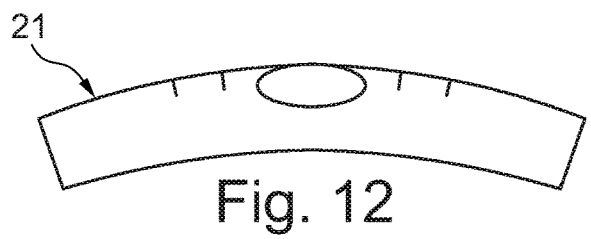
FIG. 12 shows an embodiment of a bubble housing being a part of the level means.

FIG. 12 illustrates a straight tubular spirit level 21 having a uniform diameter, however, having a curvature.

Figure 13:
FIG. 13 shows a further embodiment of a bubble housing being a part of the level means.

FIG. 13 illustrates an embodiment with a straight tubular spirit level 21 in which the central part is increased compared to the diameter of the outer ends of the tubular spirit level.

The embodiments of FIGS. 12 and 13 may be used in the level means 19 illustrated in FIG. 10.

Figure 14:
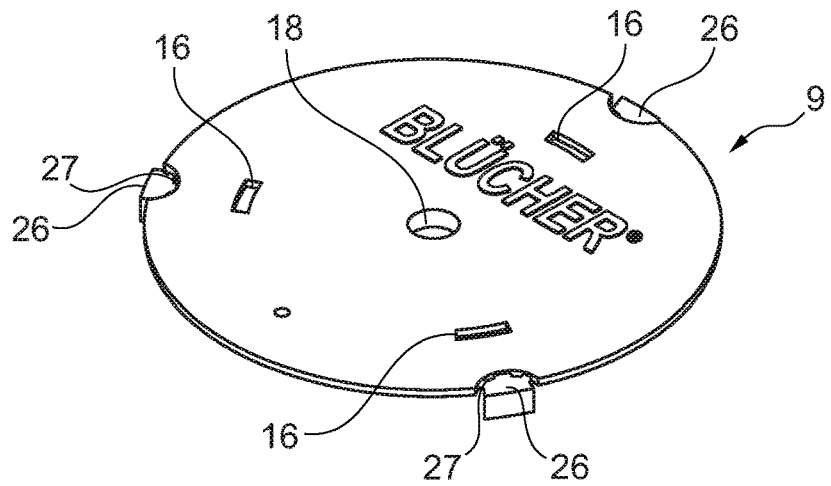
FIG. 14 shows a further embodiment for a cover plate.

FIG. 14 illustrates a cover plate 9 having openings 16 for a screw driver and a hollow 18 for containing a level means.

This embodiment comprises first locking means in the form of tabs 26 which through weakening lines 27 are connected to the main part of the cover plate 9. The tabs will have a part arranged to engage under the flange of the drain.

When inserting a screw driver in the opening 16 and exerting a force, the tabs 26 will break off by a breaking at the weakening line. The tab 26 will have a form as explained with the locking tabs 10 above.

Figure 15:
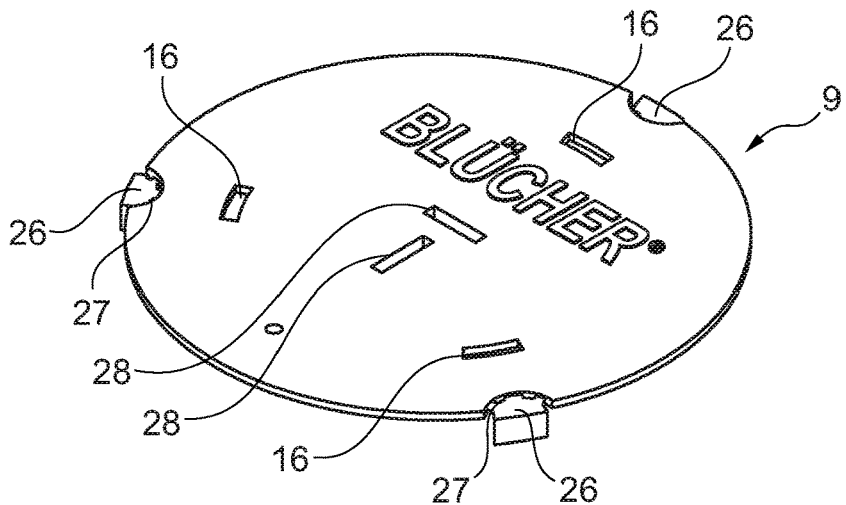
FIG. 15 shows a further embodiment of a cover plate.

FIG. 15 corresponds to FIG. 14. The cover plate according to FIG. 15 is provided with two rectilinear hollows 28 instead of the circular hollow 18 illustrated in FIG. 14. The hollows 28 are provided directly in the cover plate 19 and are intended for containing tubular spirit level 21 of the type illustrated in FIG. 12 or 13.

Figure 16:
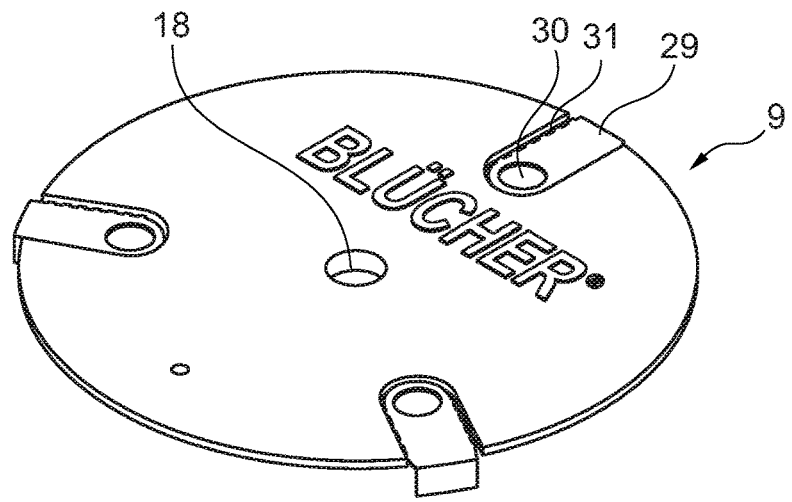
FIG. 16 shows a further embodiment for a cover plate.

FIG. 16 illustrates a further embodiment for a cover plate 9. The cover plate 9 is provided with with first locking means in form of tabs 29. The tabs will have a part arranged to engage under the flange of the drain. The tabs are provided with a pull eye 30 in which a finger can be inserted. Accordingly, the tab 29 can be denoted as a pull tab. The tab 29 is connected with the main part of the cover plate 9 through a weakening line 31.

When inserting a finger in the pull eye 30, it is possible to remove the tab 29.

Accordingly, this cover plate may be removed without the use of a screw driver.

Figure 17:
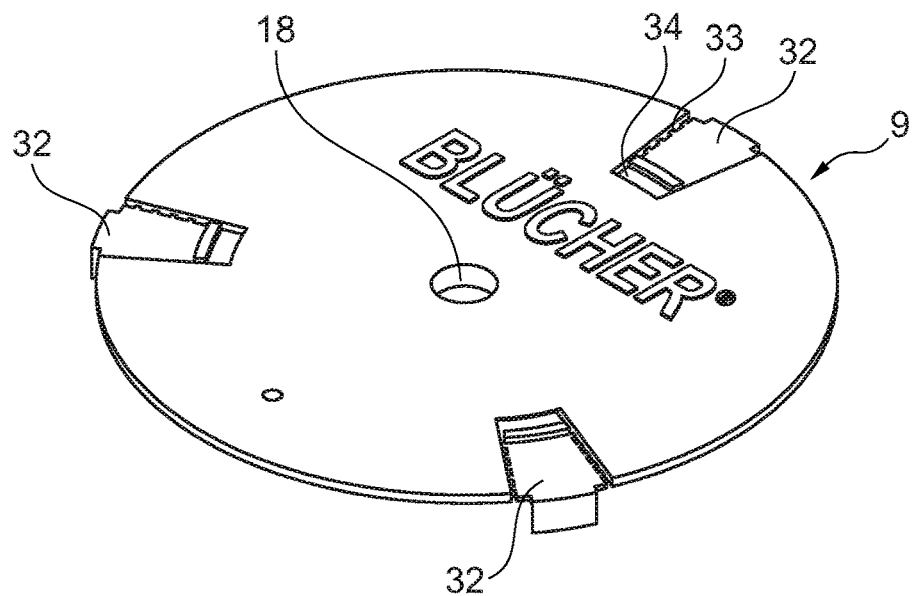
FIG. 17 shows a further embodiment for a cover plate.

FIG. 17 illustrates a cover plate 9 being provided with tabs 32. Tabs 32 are connected with the main part of cover plate 9 through a weakening line 33 which leaves an opening 34 between the tab 32 and the main part of the cover plate. The opening 34 can be used for inserting a screw driver.

Figure 18:
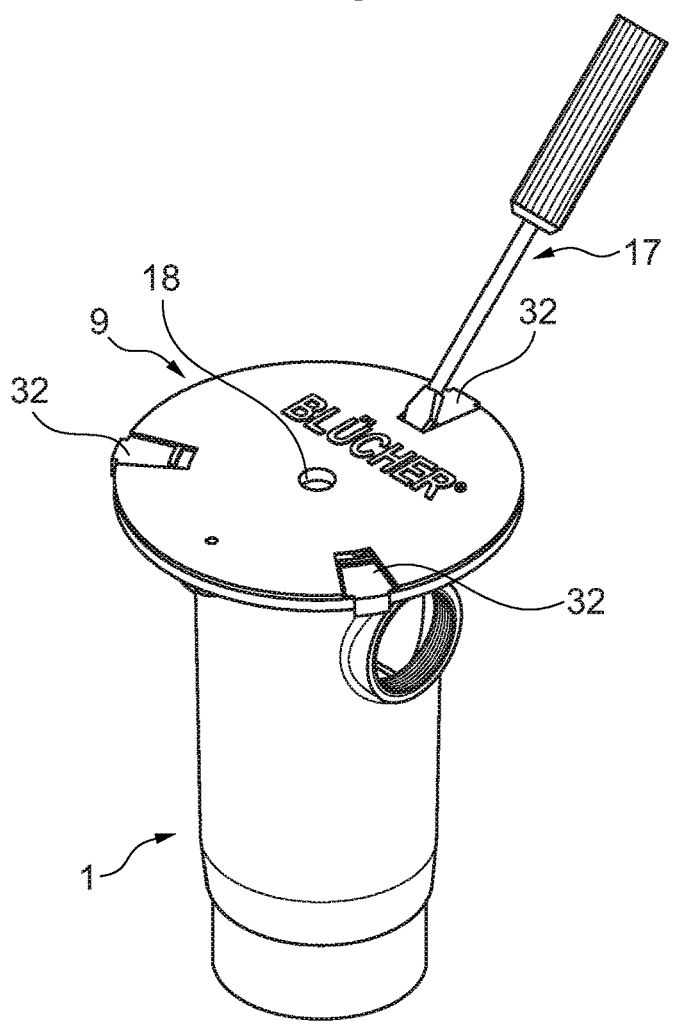
FIG. 18 corresponds to FIG. 9 and illustrates an initial step in removing the cover plate of FIG. 17 from a drain according to FIGS. 1 and 2.

FIG. 18 illustrates the embodiment of FIG. 17 in which the screw driver 17 is inserted in the opening 34 in order to remove the tab 32 from the remainder of the cover plate.

Figure 19:
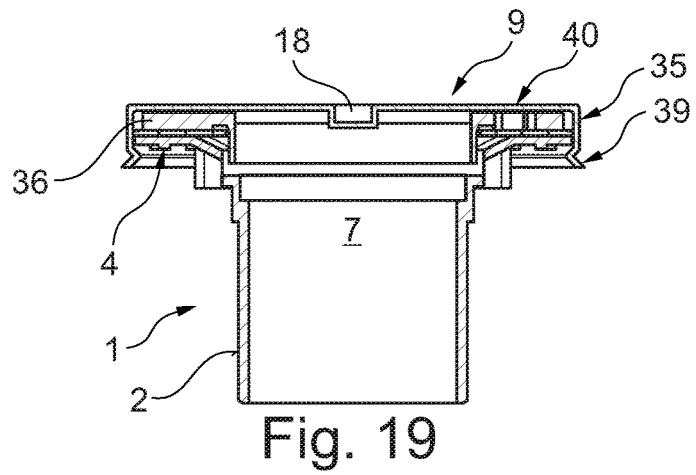
FIGS. 19-21 illustrate a further embodiment of a cover plate and a drain according to the present disclosure.
Figure 20:
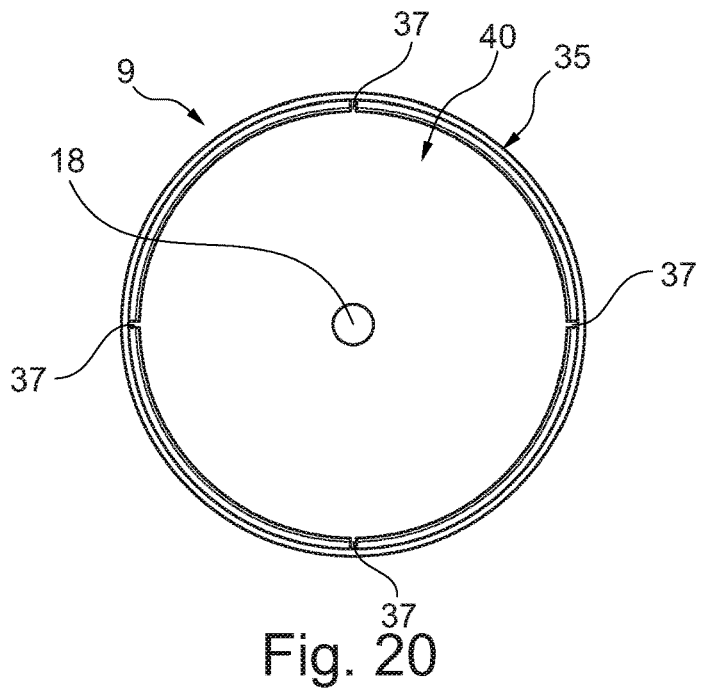
Figure 21:
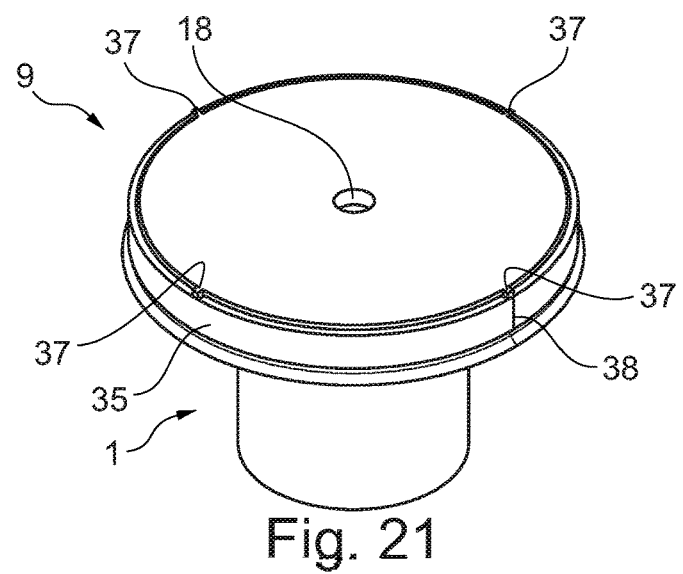

FIGS. 19-21 illustrate a further embodiment of a cover plate and a drain according to the present disclosure.

In the cross section in FIG. 19 one can see that the cover plate 9 is provided with a circular part 40 and a circumferential wall 35 connected with the circular part 40 of the cover plate 9.

The circumferential wall 35 has at a distal end a narrow portion 39 which has a diameter which is smaller than the diameter of the circumferential wall arranged close to the circular part 40. Hereby the narrow portion 39 can enter into engagement under the flange 4. In the embodiment illustrated, a clamping membrane 36 is arranged between the flange 4 and the circular part of the cover plate 9.

In the top view illustrated in FIG. 20, one can see that the cover plate is provided with weakenings in form of incisions 37 arranged with regular distance around the circumference where the circular part 40 is connected with the circumferential wall 35. The incisions make it easier that the circumferential wall 35 is divided into different portions which can easily be bent away when removing the cover plate 9 from the drain 1.

From the perspective view illustrated in FIG. 21, one can see that the circumferential wall 35 is provided with a weakening line 38. The weakening line 38 makes it easier to damage the circumferential wall 35 in order to remove the cover plate 9 from the drain 1.

Figure 4:
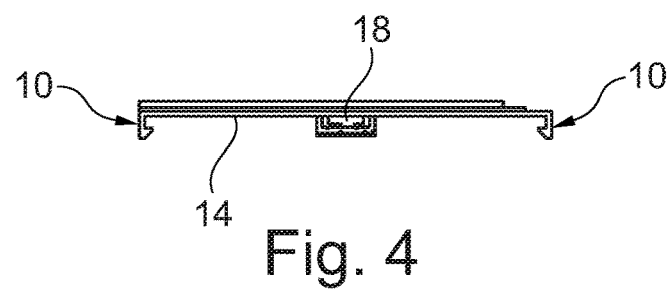
FIG. 4 illustrates a view of the cover plate of FIG. 3 as seen from the side.
Figure 5:
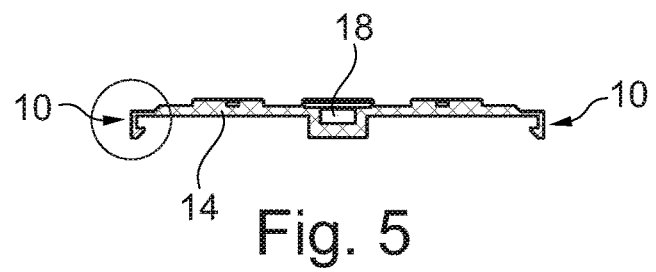
FIG. 5 shows a cross section IV-IV in FIG. 3.

In the above embodiments the tabs provided in the cover plate 9 will have the form corresponding to the locking tabs 10 disclosed in FIG. 4-6. However, other embodiments for locking tabs are possible if they ensure a secure engagement with the drain 1 during installation.

FIGS. 22-26 illustrate a further embodiment for a combination of a drain 1 and a cover plate 9.

In these Figures, the first locking means is provided in form of a slit 41 which is provided in a recessed part 42 of the top surface 43 of the cover plate 9. The recessed part 42 is connected with the top surface 43 through wall parts 44.

Figure 22:
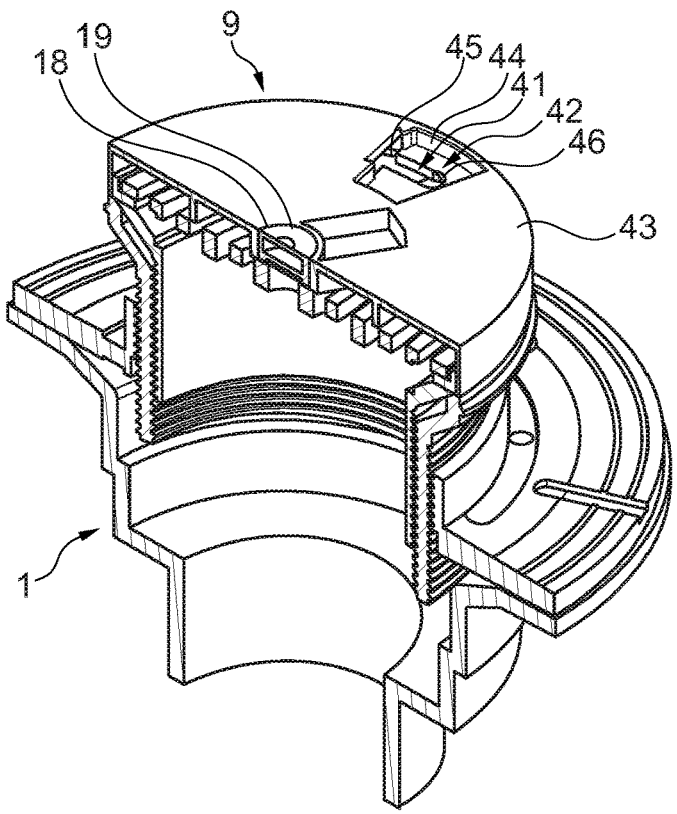
FIG. 22 illustrate a cross sectional perspective view of a further embodiment of a cover plate and a drain, according to the present disclosure.
Figure 23:
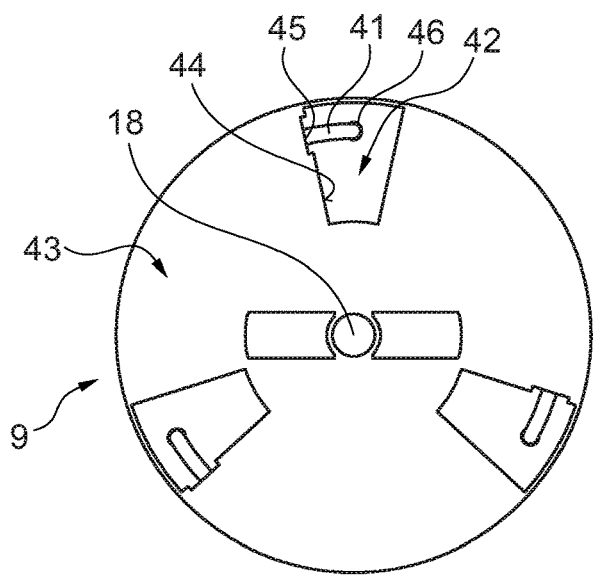
FIG. 23 illustrate a plan view of the cover plate illustrated in FIG. 22.
Figure 24:
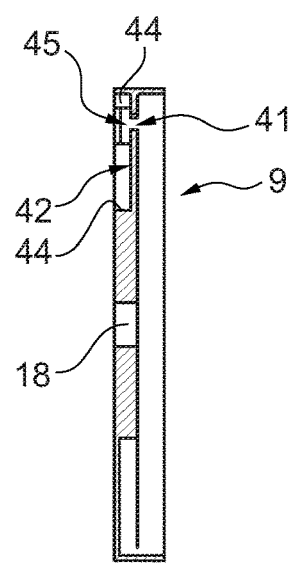
FIG. 24 illustrate a cross section through the cover plate illustrated in FIG. 22.
Figure 25:
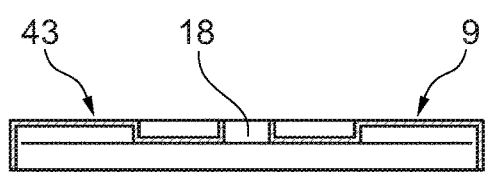
FIG. 25 illustrate a further cross section through the cover plate illustrated in FIG. 22.
Figure 26:
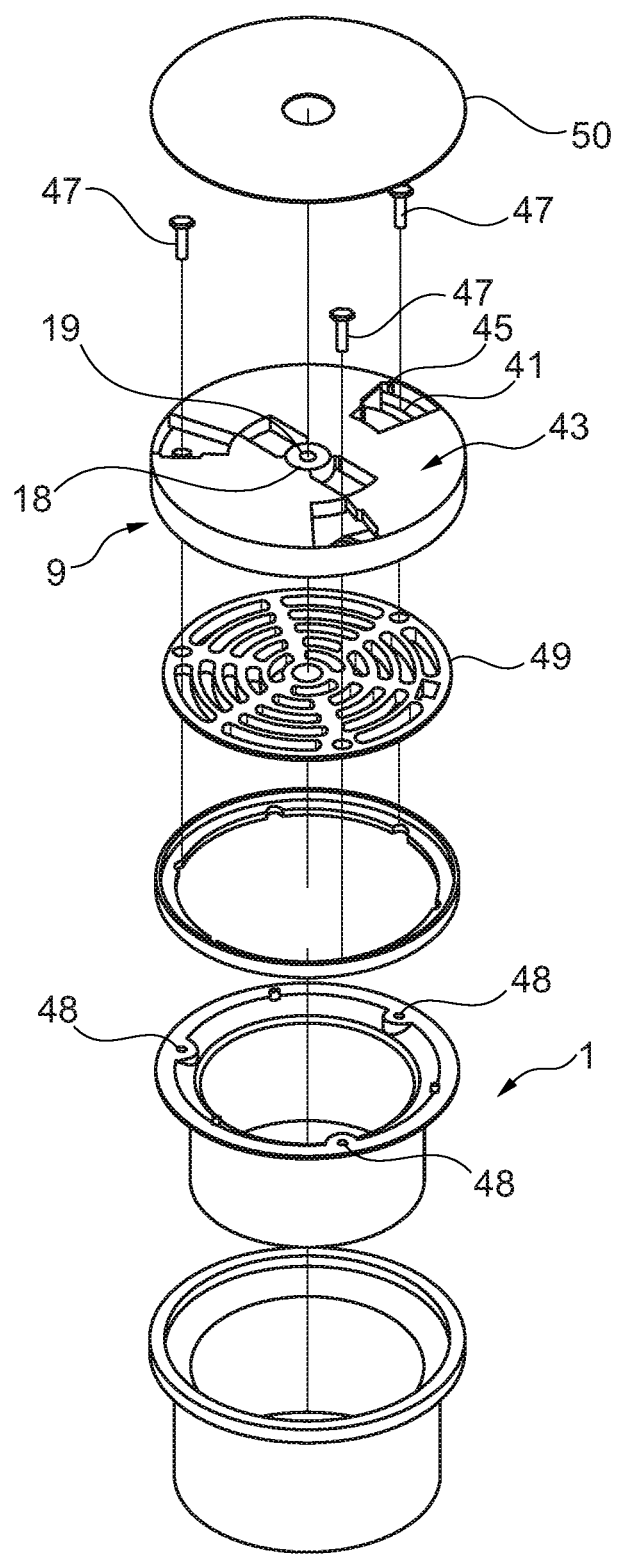
FIG. 26 illustrate an exploded view of the cover plate and the drain illustrated in FIG. 22.

As best shown in FIG. 22, there is a wall opening 45. The wall opening 45 is in connection with the slit 41. One can say that the slit 41 will open into the wall opening 45.

The slit 41 is at an end portion provided with a chamfer 46 which allow a flat head screw 47 to sit in. The screw 47 connects a grate 49 to the drain 1 by being screwed into threads 48 provided in the drain 1.

Accordingly, the cover plate 9 here will make use of elements, namely the screws 47 which are already present in the product for attaching the cover plate 9 to the drain 1. There may be provided any number of screws.

Before placing the cover plate 9 on the drain 1, the screws 47 will not be tightened totally. Hereby the cover plate may be arranged on top of the grate 49 and rotated in such a way that the screws 47 enter through the wall opening 45 and into the slit 41. The slit 31 will have a part circular form in order to have a smooth rotation. When the screws 47 are aligned with the chamfer 46, the screws 47 will be tightened. Hereby the cover plate 9 is affixed to the drain 1. As the cover plate 9 is in contact with the grate 49, a secure orientation of the cover plate 9 and the grate 49 is established whereby the level means 19 arranged in the opening 18 is ready for use when aligning the drain 1.

After the cover plate 9 is arranged, a protective sheet 50 having a form corresponding to the form of the surface 43 of the cover plate 9 may be glued to the cover plate 9. Hereby the protective sheet 50 is secured so that the cover plate 9 may not unintentional be removed from the drain 1.

When the cover plate 9 shall be removed from the grate 49, the protective sheet 50 is broken or torn away. Hereby it is possible to loosen the screws 47 and effect a rotation of the cover plate 9 whereby the screws 47 pass through the slit 41 and enter through the respective wall opening 45. Hereby it is possible to remove the cover plate 9 from the drain 1.

POSITION NUMBER LIST 1 drain
2 lower part
3 surface
4 upper end
5 flange
6 hole
7 opening
8 thickness
9 cover plate
10 locking tabs
11 circumferential edge
12 edge area
13 outer end
14 plate portion
15 weakening line
16 opening 17 screw driver
18 hollow
19 level means
20 housing
21 tubular spirit level
22 bubble
23 graduation
24 bull's eye spirit level
25 leg portion
26 tab
27 weakening line
28 hollow
29 tab
30 pull eye
31 weakening line
32 tab
33 weakening line
34 opening
35 circumferential wall
36 clamping membrane
37 incision
38 weakening line
39 narrow portion
40 circular part
41 slit
42 recessed part
43 top surface of cover plate
44 wall parts
45 wall opening
46 chamfer—in slit
47 screw
48 thread
49 grate
50 protective sheet

The invention claimed is:

1. A combination comprising: a cover plate and a drain, wherein the cover plate is provided with first locking means, wherein the drain is provided with cooperating second locking means for releasable connection of the cover plate to the drain, wherein the cover plate is provided with level means for determining the orientation of the cover plate and thereby also the drain in relation to a horizontal plane or a vertical plane, and wherein the first locking means or the second locking means comprises a weakening arranged such that at least a part of the locking means is damaged when the cover plate is removed from the drain as the cover plate is a temporary cover plate for use during installation of the drain.

2. The combination according to claim 1, wherein the level means is chosen between a bull's eye spirit level and a combination of two perpendicularly arranged tubular spirit levels.

3. The combination according to claim 2, wherein the level means comprises a bubble housing being provided with graduations for visual indication of an inclination.

4. The combination according to claim 1, wherein the cover plate is made of plastic, and that the level means is embedded into the cover plate.

5. The combination according claim 1, wherein the weakening is a weakening line, which is arranged to ensure that at least a part of the first locking means breaks off when the cover plate is removed.

6. The combination according to claim 1, wherein the first locking means comprises locking tabs arranged along a circumferential edge of the cover plate and that the second locking means comprises a flange or a groove in the drain.

7. The combination according to claim 1, wherein the cover plate comprises at least one opening in which a tool can be inserted in order to tilt or rotate the cover plate.

8. The combination according to claim 7, wherein the tilting or rotation of the cover plate causes a damaging of the locking means by a tilting or rotational movement of the cover plate for removing the cover plate from the drain.

9. The combination according to claim 7, wherein the opening in the cover plate is a slit in which a screw driver may be inserted.

10. The combination according to claim 1, wherein the drain is a drain bowl, a drain stub or other drain unit arranged for mounting in a floor or other horizontal surface from which liquid shall be drained.

11. The combination according to claim 1, wherein the cover plate is made by vacuum forming and comprising a circular part and a circumferential wall connected to the circular part and having a narrow portion at a distal end of the circumferential wall.

12. The combination according to claim 11, wherein at least one perforation is provided in the circumferential wall.

13. The combination according to claim 1, wherein the first locking means is at least one slit which is provided in a recessed part of the surface of the cover plate, the recessed part, via wall parts, is connected to the surface of the cover plate, the wall parts are provide with a wall opening connected with the slit, the cooperating second locking means comprises a screw passing through a corresponding slit for connecting the cover plate to the drain, the screw is screwed into a thread provided in the drain and the slit and wall opening are arranged such that after loosening the screw, a rotation of the cover plate brings the screw through the wall opening for releasing the connection of the cover plate to the drain.

14. A combination comprising: a cover plate and a drain, wherein the cover plate is provided with first locking means, wherein the drain is provided with cooperating second locking means for releasable connection of the cover plate to the drain, wherein the cover plate is provided with level means for determining the orientation of the cover plate and thereby also the drain in relation to a horizontal plane or a vertical plane, wherein the cover plate comprises at least one opening in which a tool can be inserted in order to tilt or rotate the cover plate, and wherein the tilting or rotation of the cover plate causes a damaging of the locking means by a tilting or rotational movement of the cover plate for removing the cover plate from the drain.

15. The combination according to claim 14, wherein the level means is chosen between a bull's eye spirit level and a combination of two perpendicularly arranged tubular spirit levels.

16. The combination according to claim 15, wherein the level means comprises a bubble housing being provided with graduations for visual indication of an inclination.

17. The combination according to claim 14, wherein the first locking means comprises locking tabs arranged along a circumferential edge of the cover plate and that the second locking means comprises a flange or a groove in the drain.

18. The combination according to claim 14, wherein the cover plate is made by vacuum forming and comprising a circular part and a circumferential wall connected to the circular part and having a narrow portion at a distal end of the circumferential wall.

* * * * *